(12) United States Patent
Guijt

(10) Patent No.: US 6,758,924 B1
(45) Date of Patent: Jul. 6, 2004

(54) METHOD OF REPAIRING CRACKED AIRCRAFT STRUCTURES

(75) Inventor: Cornelis B. Guijt, Colorado Springs, CO (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 275 days.

(21) Appl. No.: 10/124,688

(22) Filed: Apr. 15, 2002

(51) Int. Cl.[7] .............................................. B32B 35/00
(52) U.S. Cl. ...................... 156/64; 156/94; 29/402.09; 52/514; 428/63
(58) Field of Search ............................ 156/64, 94, 98; 29/904, 402.01, 402.09; 244/126, 133; 428/63; 65/28; 264/36.1, 36.18; 52/514

(56) References Cited

U.S. PATENT DOCUMENTS

| 3,700,517 | A | * | 10/1972 | Roach | 156/94 |
| 3,850,718 | A | * | 11/1974 | Trapani | 156/94 |
| 4,759,812 | A | | 7/1988 | Miller | |
| 4,978,404 | A | * | 12/1990 | Westerman, Jr. | 156/98 |
| 5,039,571 | A | | 8/1991 | Vogelesang et al. | |
| 5,424,105 | A | | 6/1995 | Stewart | |
| 5,626,934 | A | | 5/1997 | Brewer | |
| 5,799,451 | A | * | 9/1998 | Pilakoutas | 52/223.4 |
| 5,951,800 | A | * | 9/1999 | Pettit | 156/157 |
| 5,972,141 | A | | 10/1999 | Ellyin | |

* cited by examiner

Primary Examiner—Gladys J P Corcoran
(74) Attorney, Agent, or Firm—Richard A. Lambert; Bobby D. Scearce; Thomas L. Kundert

(57) ABSTRACT

A method of repairing cracked aircraft structures is disclosed. The method includes determining the net loading of an area to be repaired and then identifying a repair patch layup including a low CTE composite layer and a high CTE metal layer that will impart a loading effect opposite thereto.

7 Claims, 3 Drawing Sheets

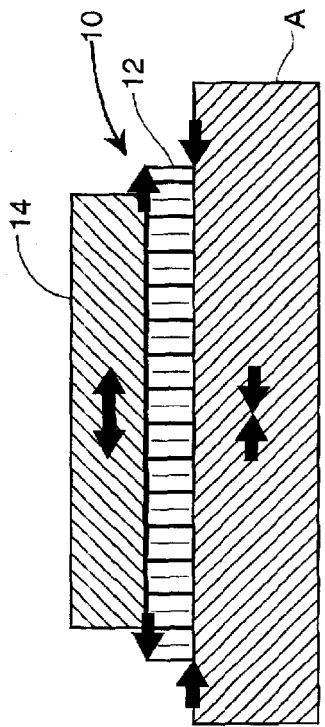
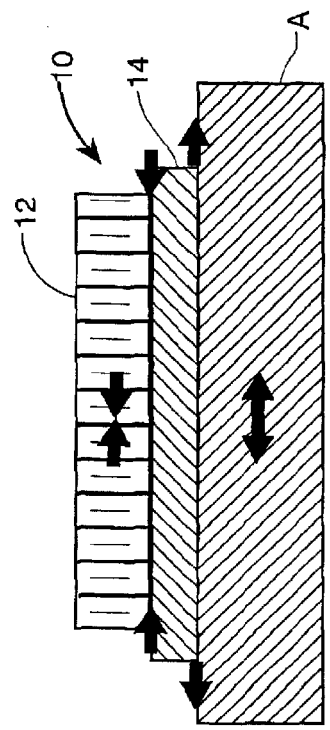
Fig. 1
Fig. 3
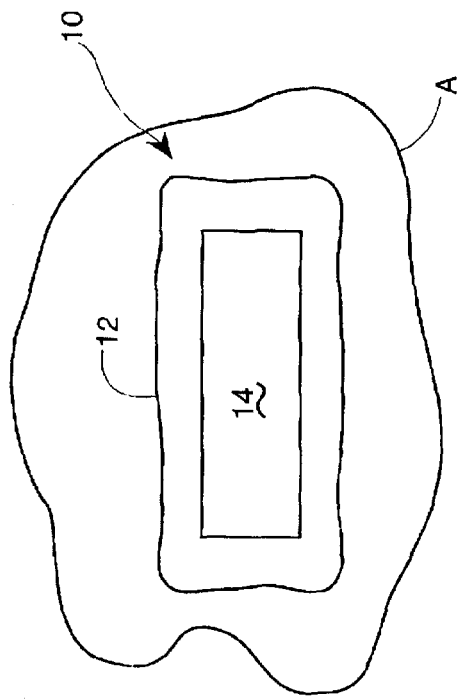
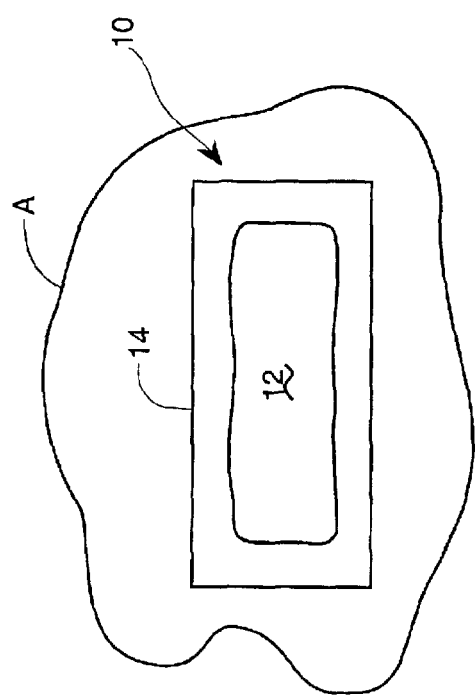
Fig. 2
Fig. 4

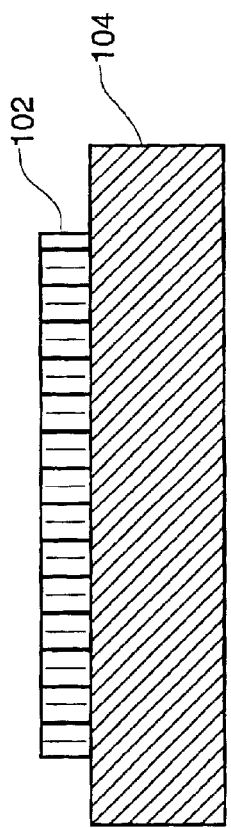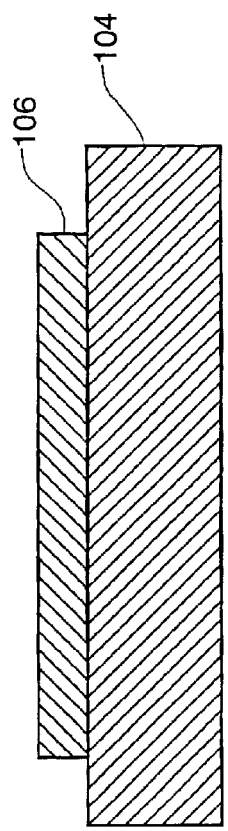
Fig. 6
PRIOR ART
Fig. 7
PRIOR ART

METHOD OF REPAIRING CRACKED AIRCRAFT STRUCTURES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a method of repairing cracks in structures and, more specifically, to a method of repairing cracked aircraft structures utilizing a repair patch layup including a composite layer and a metal layer.

The necessity for repairing cracks in aircraft structures is well known. Aircraft, by nature are highly stressed from localized structural loading on areas such as the wings as well as from repetitive loading such as take-off and landing sequences. In order to be viable, aircraft structures must be lightweight yet capable of sustaining extreme forces. As a result of the forces applied, cracks often develop. In the case of military aircraft, use in conflict often gives rise to battle damage which, if left unrepaired, can quickly lead to undesirable crack propagation. Such crack propagation, if left unchecked, can result in the aircraft becoming unserviceable, clearly an unattractive result.

In the past, cracks, holes and the like have been repaired using a sheet patch, oftentimes aluminum. The patch is retained in place by a multiplicity of rivets. For example, U.S. Pat. No. 5,424,105 to Stewart discloses an aircraft patching method using a metallic patch held in place by rivets. While patching methods such as these are often quite useful, they work best in areas having low or no net stress loading. In areas wherein stresses are imparted, the crack underlying the patch will sometimes propagate in the repaired material or through the patch material, negating the repair.

Another repair method commonly used today is patch bonding. For example, metallic structures can be repaired by adhesively bonding boron-epoxy or carbon-epoxy laminated patches over the area to be repaired. The patch is bonded in place by means of a localized elevated temperature process. Boron-epoxy patches exhibit high stiffness and strength and are useful in many situations. But, this repair method is also not without shortcomings. For example, bonding a boron-epoxy patch to an aluminum wing structure gives rise to the creation of significant residual thermal stresses resulting from the elevated temperature cure cycle, as well as from the lower temperatures encountered during operation of the aircraft due to the different coefficients of thermal expansion of these materials. These thermal stresses dramatically reduce the effectiveness of the repair, and can again render the patch ineffective.

Some recent attempts have been made to utilize fiber-metal laminates originally developed as a fuselage material as repair patch materials. While generally successful in reducing crack propagation, these repairs are sensitive to stress concentration at the edges of the repair patch.

Therefore, while the repair methods of the prior art are somewhat successful, a need exists for an improved patching method. Such a method would effectively negate residual stress loading in an area by imparting a loading effect opposite to the stress loading in the area to be repaired.

SUMMARY OF THE INVENTION

Accordingly, it is a primary object of the present invention to provide a method of repairing cracked aircraft structures overcoming the limitations and disadvantages of the prior art.

Another object of the present invention is to provide a method of repairing cracked aircraft structures that provides a satisfactory permanent repair in areas subject to high stress loading.

Yet another object of the present invention is to provide a method of repairing cracked aircraft structures that is simple to complete.

Still another object of the present invention is to provide a method of repairing cracked aircraft structures that effectively imparts a loading effect opposite to the net loading on the area to be repaired.

It is still another object of the present invention to provide a method of repairing cracked aircraft structures that utilizes commonly used repair materials.

These and other objects of the invention will become apparent as the description of the representative embodiments proceeds.

In accordance with the foregoing principles and objects of the invention, a method of repairing cracked aircraft structures is described. The method includes determining the net loading of an area to be repaired and then identifying a repair patch layup that will impart a loading effect opposite thereto.

As is known, aircraft structures such as the fuselage and wings are highly stressed and are often subject to cracking. Military planes are perhaps even more susceptible to structure cracking than commercial aircraft due to the extreme usage military aircraft are subjected to and battle damage crack propagation. While the known methods of crack repair are quite useful in certain situations, they can themselves fail due to net loading on the repaired area. This net loading can be due to operational force loading on the aircraft structure from aircraft operation as well as residual thermal loading imparted by a difference in coefficients of thermal expansion between the patch material and the material of aircraft structure.

It is a well known fact that materials expand and contract with changes in temperature. A commonly used quantifier of this natural phenomenon is the coefficient of thermal expansion or (CTE). Generally, CTE can be thought of as, a ratio of the change in length of a line segment in a body per unit of temperature change to its length at a reference temperature. Dissimilar materials have different CTEs and the union of dissimilar materials such as is found in patching applications can impart a residual thermal loading effect between the materials as they expand and contract at different rates. This residual thermal loading effect can be quite undesirable for the repair.

In addition to the residual thermal loading effect imparted by the union of dissimilar patching materials, the operational loading of the structure to be repaired will often negatively impact the repair as well. This can be a significant problem resulting in patch disbonding or delamination or can even result in the crack propagating in the repaired material or through the patch material.

Advantageously, the method of the present invention takes into account the effect of the net loading of an area to be repaired. A repair patch layup consisting of a low CTE composite layer and a high CTE metal layer is identified such that the repair patch layup will impart a loading effect opposite thereto.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a cross sectional representation of a repair patch layup fabricated according to the method of the present invention;

FIG. 2 is a plan view of a repair patch layup fabricated according to the method of the present invention shown applied to a representative aircraft structure;

FIG. 3 is another cross sectional representation of a repair patch layup fabricated according to the method of the present invention;

FIG. 4 is another plan view of a repair patch layup fabricated according to the method of the present invention shown applied to a representative aircraft structure;

FIG. 6 is a cross sectional representation of a prior art repair patch; and,

FIG. 7 is a cross sectional representation of another prior art repair patch.

DETAILED DESCRIPTION OF THE INVENTION

Figure 5:
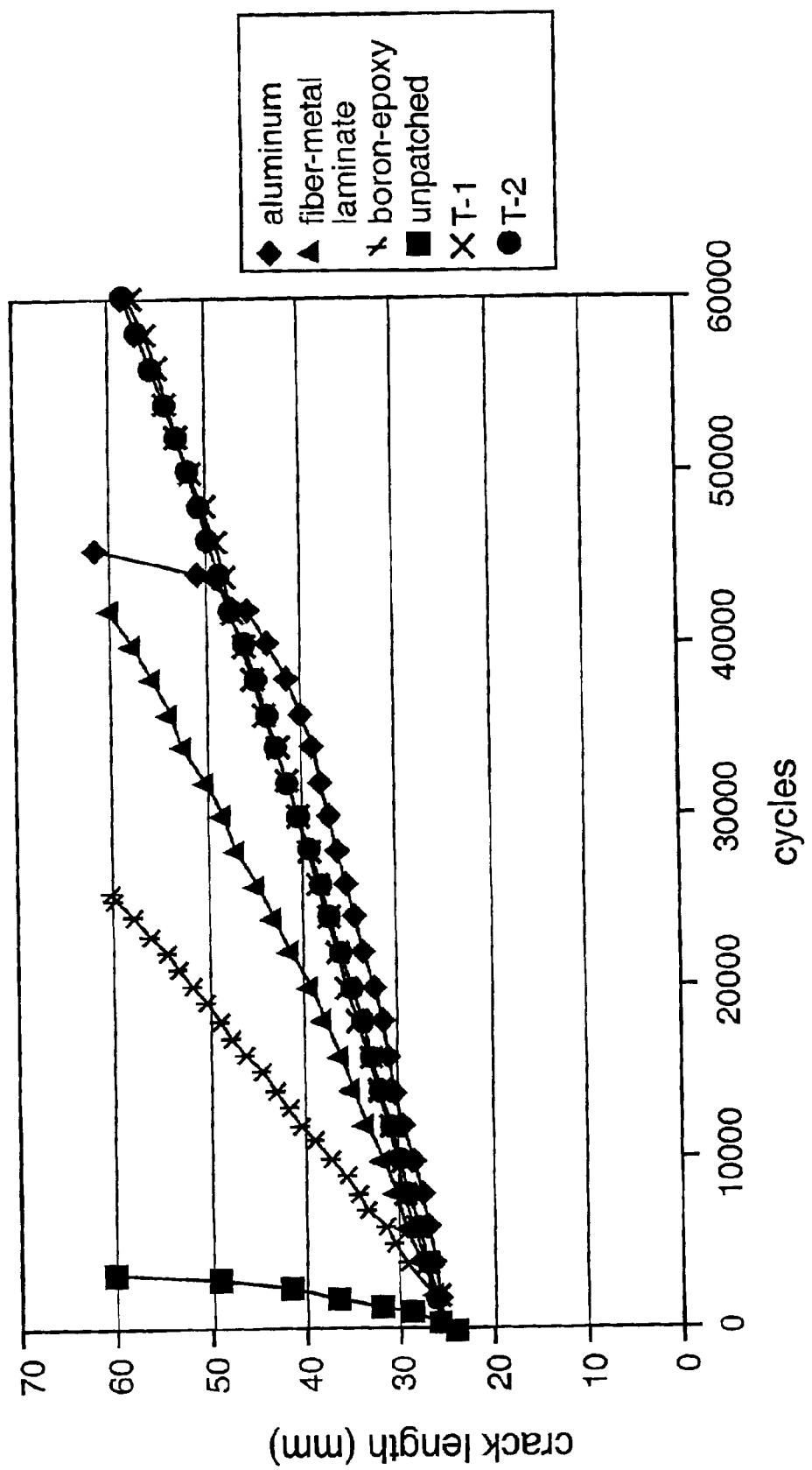
FIG. 5 is a graph illustrating the performance of several patching methods as determined by testing.

Reference is made to the drawing figures showing a repair patch layup applied according to the method of the present invention. The method includes determining the net loading of an area to be repaired and then identifying a repair patch layup that will impart a loading effect opposite thereto.

As is known, aircraft structures such as fuselage and wings are highly stressed and are often subject to cracking. If left unchecked, cracks can propagate, and may seriously compromise the strength of the aircraft structure. Indeed, the presence of cracks in key areas can even be responsible for grounding aircraft. Military aircraft are perhaps even more susceptible to structure cracking than commercial aircraft due to the extreme usage military aircraft are subjected to as well as battle damage crack propagation. While the prior art methods of crack repair are useful in certain situations, they can themselves fail due to net loading on the repaired area due to force loading on the aircraft structure from operation as well as residual thermal loading imparted by the bonding process and from aircraft operation itself such as from aerodynamic heating.

It is well known that materials expand and contract with changes in temperature. A commonly used quantifier of this natural phenomenon is the coefficient of thermal expansion or (CTE). Generally, CTE can be thought of as a ratio of the change in length of a line segment in a body per unit of temperature change to its length at a reference temperature. Dissimilar materials have different CTEs and the union of dissimilar materials such as is found in patching applications can impart a residual thermal loading effect between the materials as they expand and contract at different rates. The stresses from this residual thermal loading effect can be quite undesirable, and can negatively affect the patched material.

According to the method of the present invention, the net loading of the area to be repaired is determined. This can be determined analytically by calculation or testing. For example, if the crack under the patch grows under tension loading, the structure is tension loaded, sometimes referred to as tension critical. On the other hand, if the adhesive or the composite material at the patch tip fails (disbonds/delaminates) in compression, the structure is compression loaded, sometimes referred to as compression critical.

The repair methods of the prior art can lead to failure of the repair due to a failure to take the net loading of the area to be repaired into account. For example, a repair method commonly used is patch bonding using boron-epoxy or carbon-epoxy laminated patches 102 over the area to be repaired 104. See FIG. 6. Boron-epoxy patches have a low CTE and bonding a boron-epoxy patch to a structure having a higher CTE such as an aluminum wing structure gives rise to the creation of residual thermal stresses resulting from the elevated temperature cure cycle. Additional thermal stresses are imparted from the lower temperatures encountered during operation of the aircraft due to the different coefficients of thermal expansion of these materials, negatively affecting the patch.

Another prior art repair method frequently used is attachment, usually by riveting, of a sheet of material 106 such as aluminum. See FIG. 7. If the materials are identical, such as an aluminum plate attached to an aluminum wing structure, the patch and structure are free of residual thermal stresses but, a big disadvantage is that with an aluminum patch, the crack underlying the patch 106 can propagate through the patch material, as a result of stress loading such as from aircraft operation, negating the repair.

Reference is made to drawing FIGS. 1 through 4 showing a repair patch layup 10 fabricated according to the method of the present invention. The repair patch layup 10 includes a low CTE composite layer 12 and a high CTE metal layer 14. In FIGS. 2 and 4 the repair patch layup 10 is shown as applied to a representative aircraft structure A. The aircraft structure A can be a wing surface or a fuselage surface or any other surface requiring crack repair. As will be described in more detail below, the repair patch layup fabricated according to the present invention dramatically overcomes the limitations of the prior art.

According to the method of the present invention, the material layers of the repair patch layup 10 are identified pursuant to the net loading of the area to be repaired More specifically, the repair patch layup 10 can be fabricated by first applying a low CTE composite layer 12 and substantially covering that layer with a high CTE metal layer 14. Or, the repair patch layup 10 can be fabricated by first applying a high CTE metal layer 14 and substantially covering that layer with a low CTE composite layer. As stated, the determination of which layer to be applied first depends on the net loading of the area to be repaired.

Reference is made to FIG. 1. As shown, a low CTE composite layer 12 is applied to the area to be repaired and a high CTE metal layer 14 is applied over that. This has the overall net result of adding a localized compressive force to the aircraft structure A. The composition of this layup 10 would be chosen for application to a tension loaded area. In this way, the localized tension stress on the crack is reduced by the opposite loading effect imparted thereto by the composition of the repair patch layup 10. As shown the high CTE metal layer 14 exerts a tensile stress (shown diagrammatically by the force vectors) at its edges. The tensile stress (shown diagrammatically by the force vectors) correspondingly imparted to the low CTE composite layer 12, is effectively reduced due to the low CTE nature of the material. This has the effect of reducing the tension within the high CTE metal layer 14 as well as imparting a net compressive loading effect to the area to be repaired, both under the patch and at the tip.

Conversely, and as shown in FIG. 3, a high CTE metal layer 14 is applied to the area to be repaired and a low CTE composite layer 12 is applied over that. This has the overall net effect of adding a localized tension force to the aircraft structure A. The composition of this layup 10 would be chosen for application to a compression loaded area. In this way, localized compression stress on the crack is reduced by the opposite loading effect imparted thereto by the composition of the repair patch layup 10. As shown, the low CTE composite layer exerts a compressive stress (shown diagrammatically by the force vectors) at its edges. The compressive stress (shown diagrammatically by the force vectors) correspondingly imparted to the high CTE metal layer is effectively reduced due to the high CTE nature of the material. This has the effect of imparting a net tension loading effect to the area to be repaired.

Advantageously, and according to an important aspect of the present invention, the repair patch layup 10 described above provides greatly enhanced patching performance because the combination of the low CTE composite layer and the high CTE metal layer provides an enhanced ability to withstand higher additional localized stress loading on the repaired area due to aircraft operation. For example, in FIG. 1, the composite layer 12 by virtue of its physical properties will help prevent the crack from propagating through the metal layer 14.

In the repair patch layups 10 described above, the materials are bonded in place with the use of a structural epoxy adhesive. One commercially available structural epoxy adhesive providing satisfactory results, sold under the trademark FM, is FM-73, an epoxy film adhesive for 250 F cure, available from Cytec Industries Inc., West Paterson, N.J.

The materials and thicknesses of the repair patch can vary for particular application. It is an advantage of the present invention that the method of repairing cracked aircraft structures provides satisfactory results with readily available materials. This is of particular benefit to the aircraft industry by the avoidance of material; qualification requirements normally related to new material development. For example, aluminum is a good material choice for the high CTE metal layer 14 and commercially available boron-epoxy patch material is a good material choice for the low CTE composite layer 12. An example of a commercially available boron-epoxy patch material providing satisfactory results is 5521, a boron-epoxy Prepreg Tape, available from Textron Systems, Wilmington, Mass. Concerning the thickness, the repair is typically designed to restore the stiffness of the structure. This can be accomplished by setting the extensional stiffness of the patch (thickness of patch times Young's modulus of the patch material) equal to or slightly higher than the extensional stiffness of the structure (thickness of structure times Young's modulus of the structure material).

The advantages of the method of the present invention are borne out by experimentation as dramatically illustrated in FIG. 5. As shown, several prior art patching methods such as boron-epoxy patch, and aluminum patch were tested, each having an extensional stiffness between 1.0 and 1.17. Two separate repair patch layups fabricated according to the method of the present invention (T-1 and T-2) were also tested. As shown in FIG. 5, the crack length in mm is plotted versus number of fatigue cycles with an alternating stress between 120 MPa and 6 MPa (17.4 ksi and 0.9 ksi). As shown, the repairs made according to the method of the present invention present a dramatic reduction in crack-growth rate over boror-epoxy repairs and fiber-metal laminate repairs. The performance is very close to the aluminum patch. And it should also be pointed out that the frequently occurring patch tip problems and patch cracking problems (see the dramatic increase in crack-growth rate of the aluminum patch in FIG. 5) associated with the methods of the prior art were absent in the repair patch layups fabricated according to the teachings of the method of the present invention.

It should be noted that while the method of the present invention has been described using boron-epoxy as an example of the low CTE composite and aluminum as an example of the high CTE metal, the invention is not considered so limited. Other materials can be utilized such as steel alloys, titanium alloys and composites such as glass-epoxy, aramid-epoxy, fibers combined with different resin systems such as polyesters, vinyl-esters, thermoplastics, etc., without departing from the spirit and scope of the present invention.

In summary, numerous benefits have been described from utilizing the principles of the present invention. The method of repairing cracked aircraft structures of the present invention advantageously includes determining the net loading of an area to be repaired and then identifying a repair patch layup that will impart a loading effect opposite thereto. In this way, a permanent, lasting repair can be made. The method can be satisfactorily utilized with readily available materials and is relatively simple to complete.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. A method of repairing a cracked structure comprising the steps of:
    determining the net loading of an area to be repaired by evaluating whether said area to be repaired is compression loaded or tension loaded;
    identifying a repair patch layup including a low coefficient of thermal expansion composite layer and a high coefficient of thermal expansion metal layer such that said repair patch layup will, upon application, impart a loading effect opposite to the net loading of the area to be repaired; and,
    applying said repair patch layup.

2. The method of claim 1 wherein said metal is aluminum.

3. The method of claim 1 wherein said low coefficient of thermal expansion composite is boron-epoxy.

4. The method of claim 1 wherein said low coefficient of thermal expansion composite is carbon-epoxy.

5. A method of repairing a cracked structure by applying a patch to the cracked area, comprising the steps of:
    measuring the thickness of the cracked area to be repaired;
    calculating the extensional stiffness of the area to be repaired by multiplying the thickness from said measuring step above by the Young's modulus of the structure material;
    determining whether the net loading of the area to be repaired is compression loaded or tension loaded; and,
    fabricating a repair patch layup, such that said repair patch layup will upon application impart a loading effect opposite to the net loading from said determining step above, by applying a high coefficient of thermal expansion metal lager to the area to be repaired with a low coefficient of thermal expansion composite layer applied thereon if the area to be repaired is compression loaded from said determining step above, or by applying a low coefficient of thermal expansion composite layer to the area to be repaired with a high coefficient of thermal expansion metal layer applied thereon if the area to be repaired is tension loaded from said determining step above, said repair patch layup further having an extensional stiffness substantially equal to the extensional stiffness of the area to be repaired from said calculating step above.

6. The method of claim 5 wherein said high coefficient of thermal expansion metal is aluminum.

7. The method of claim 5 wherein said low coefficient of thermal expansion composite is boron-epoxy.

* * * * *

UNITED STATES PATENT AND TRADEMARK OFFICE
CERTIFICATE OF CORRECTION

PATENT NO. : 6,758,924 B1
DATED : July 6, 2004
INVENTOR(S) : Cornelis B. Guijt

It is certified that error appears in the above-identified patent and that said Letters Patent is hereby corrected as shown below:

Column 4,
Line 34, a period "." should appear after "repaired".

Column 5,
Line 31, the semicolon ";" should be deleted.
Line 59, "boror" should read -- boron --.

Column 6,
Line 66, "lager" should read -- layer --.

Signed and Sealed this

Thirtieth Day of November, 2004

JON W. DUDAS
*Director of the United States Patent and Trademark Office*